US010081297B1

(12) United States Patent
Yelda et al.

(10) Patent No.: US 10,081,297 B1
(45) Date of Patent: Sep. 25, 2018

(54) VARIABLE BRAKE LIGHT SYSTEM

(71) Applicant: Calsonic Kansei North America, Inc., Farmington Hills, MI (US)

(72) Inventors: Richard Yelda, Farmington Hills, MI (US); Ahmet Kucukkomurler, Farmington Hills, MI (US)

(73) Assignee: CALSONIC KANSEI NORTH AMERICA, INC., Farmington Hills, MI (US)

( * ) Notice: Subject to any disclaimer, the term of this patent is extended or adjusted under 35 U.S.C. 154(b) by 0 days.

(21) Appl. No.: 15/591,825

(22) Filed: May 10, 2017

(51) Int. Cl.
*B60Q 1/44* (2006.01)
*B60Q 1/00* (2006.01)
*B60Q 1/26* (2006.01)
*H05B 33/08* (2006.01)

(52) U.S. Cl.
CPC ........... *B60Q 1/444* (2013.01); *B60Q 1/0076* (2013.01); *B60Q 1/2696* (2013.01); *H05B 33/0854* (2013.01); *H05B 33/0872* (2013.01)

(58) Field of Classification Search
CPC ...... B60Q 1/26; B60Q 1/2603; B60Q 1/2607; B60Q 1/44; B60Q 1/444; B60Q 1/447; B60Q 1/46; B60Q 1/52
See application file for complete search history.

(56) References Cited

U.S. PATENT DOCUMENTS

| | | | | |
|---|---|---|---|---|
| 6,100,799 A * | 8/2000 | Fenk | ...................... | B60Q 1/444 307/10.8 |
| 6,693,525 B1 * | 2/2004 | McIlvain | ................. | B60Q 1/44 200/61.89 |
| 6,753,769 B1 * | 6/2004 | Elliott | ..................... | B60Q 1/441 340/464 |
| 7,307,518 B2 * | 12/2007 | Bogos | .................... | B60Q 1/302 340/467 |
| 8,547,219 B2 * | 10/2013 | Kisiel | .................... | B60Q 1/448 340/468 |
| 9,855,889 B1 * | 1/2018 | Mullis | ...................... | B60Q 1/44 |
| 2002/0133282 A1 * | 9/2002 | Ryan | ...................... | B60Q 1/444 701/70 |
| 2004/0246737 A1 * | 12/2004 | Voelker | .................. | B60Q 1/302 362/503 |
| 2006/0273891 A1 * | 12/2006 | Quach | .................... | B60Q 1/302 340/467 |
| 2007/0008095 A1 * | 1/2007 | Gwinn | .................... | B60Q 1/444 340/476 |
| 2008/0164993 A1 * | 7/2008 | Douglas | ................. | B60Q 1/444 340/479 |
| 2008/0297338 A1 * | 12/2008 | Singh | ..................... | B60Q 1/441 340/479 |
| 2010/0085180 A1 * | 4/2010 | Mathis | ................... | B60Q 1/444 340/467 |
| 2013/0190972 A1 * | 7/2013 | Pribula | .................... | B60Q 1/44 701/36 |
| 2016/0107564 A1 * | 4/2016 | Sola Gomfaus | ..... | B60Q 1/2607 315/79 |

(Continued)

*Primary Examiner* — Jason M Crawford

(74) *Attorney, Agent, or Firm* — Foley & Lardner LLP

(57) ABSTRACT

A variable brake light system that is within a vehicle with a brake pedal and includes a static brake light, multiple variable brake lights, and a control system. The control system is configured to turn on the static brake light when the brake pedal is activated. The control system is configured to change a display of the multiple variable brake lights according to an amount of activation of the brake pedal.

19 Claims, 7 Drawing Sheets

(56) References Cited

U.S. PATENT DOCUMENTS

2016/0185283 A1* 6/2016 Weiner .................. B60Q 1/441
                                                    340/469
2016/0250966 A1* 9/2016 Giguere ................ B60Q 1/444
                                                    340/479

* cited by examiner

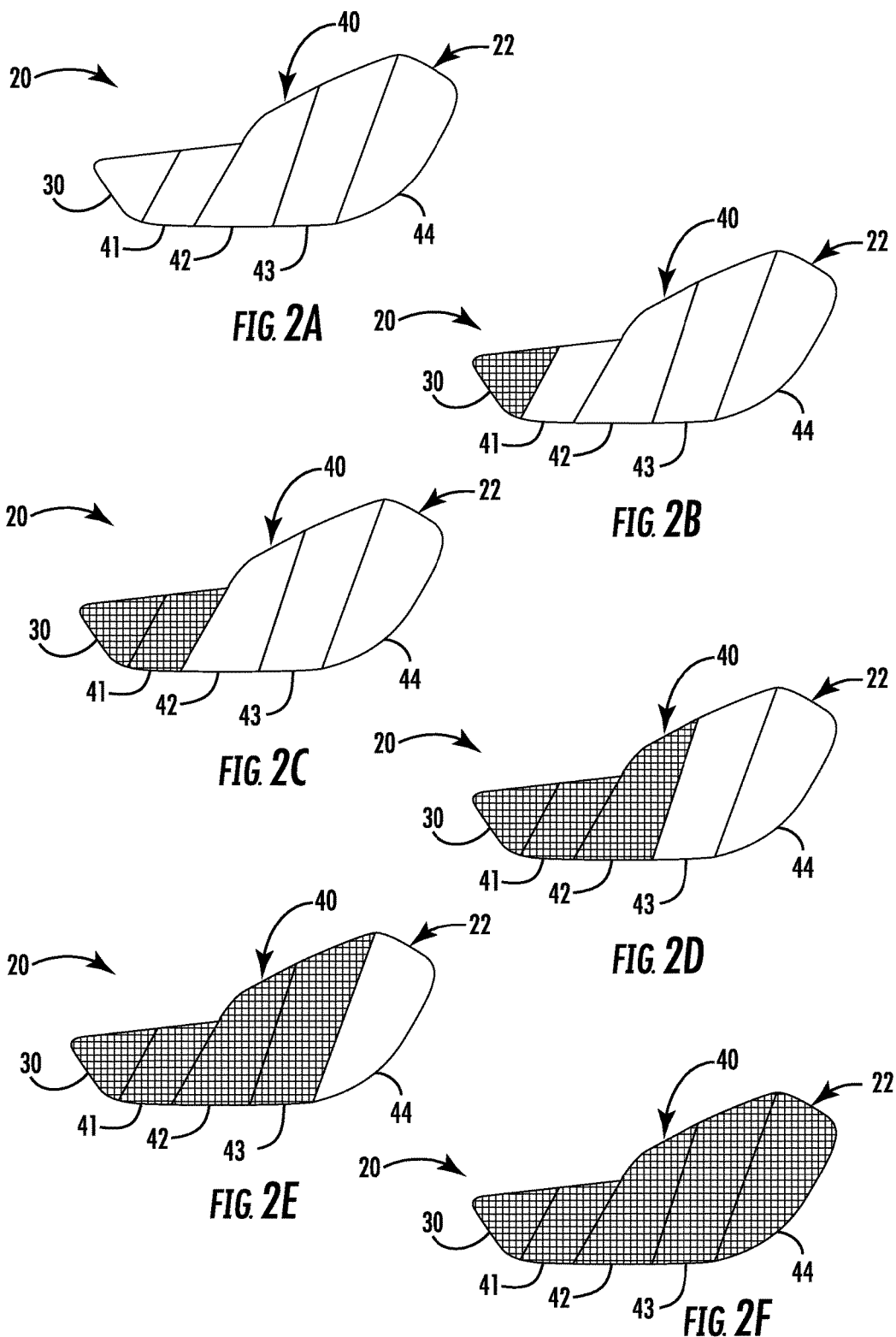

VARIABLE BRAKE LIGHT SYSTEM

BACKGROUND

The present application relates generally to a variable brake light system for use in vehicles such as automobiles. More specifically, the present application relates to a brake light system that is configured to provide a visual indication of the severity of a braking event to surrounding drivers.

Vehicles include brake lights that turn on automatically when the driver is braking (i.e., pushing the brake pedal) to indicate that the vehicle is slowing down. The brake lights are on static switches and have two states (i.e., on and off) to show whether the brake pedal is engaged or disengaged. When the brake pedal is not pushed, the brake lights are completely off. When the brake pedal is pushed, the brake lights are turned on completely, regardless of how hard or fast the driver is pushing the brake pedal. This may make it more challenging for a driver in a trailing vehicle to readily determine how severe a braking event may be (e.g., how fast the leading vehicle may be decelerating). As a result, it may be difficult for the trailing driver to determine whether the driver in the leading vehicle is simply lightly holding the brake pedal to make minor adjustments to their speed or if such driver is slamming on their brake pedal in an effort to avoid a collision.

It would be advantageous to provide an improved braking system that provides enhanced information to trailing vehicles while still meeting requirements of government safety regulations. It would also be advantageous for such a system to include governing logic that allows the system to provide differing indications under certain conditions. These and other advantageous features will become apparent to those reviewing the present disclosure, and all such advantages are intended to fall within the scope of the present disclosure.

SUMMARY

One embodiment of the present disclosure relates to a brake light controller that includes a first circuit configured to turn on a first portion of a brake light assembly when a brake pedal is activated and a second circuit configured to change a display of the brake light assembly depending on at least one of pressure applied to the brake pedal or a displacement of the brake pedal.

Another embodiment of the present disclosure relates to a variable brake light system that is within a vehicle with a brake pedal and includes a static brake light, multiple variable brake lights, and a control system. The control system is configured to turn on the static brake light when the brake pedal is activated. The control system is configured to change a display of the multiple variable brake lights according to an amount of activation of the brake pedal.

Another embodiment of the present disclosure relates to a method of controlling a brake light assembly of a variable brake light system within a vehicle with a brake pedal. The method includes turning on a static brake light within the variable brake system when the brake pedal is activated and changing a display of multiple variable brake lights within the variable brake system according to an amount of activation of the brake pedal.

BRIEF DESCRIPTION OF THE DRAWINGS

FIGS. 2A to 2F are plan views of a brake light assembly of a variable brake light system according to one embodiment, illustrating the variable lighting capability of such system.

DETAILED DESCRIPTION

Figure 1A:
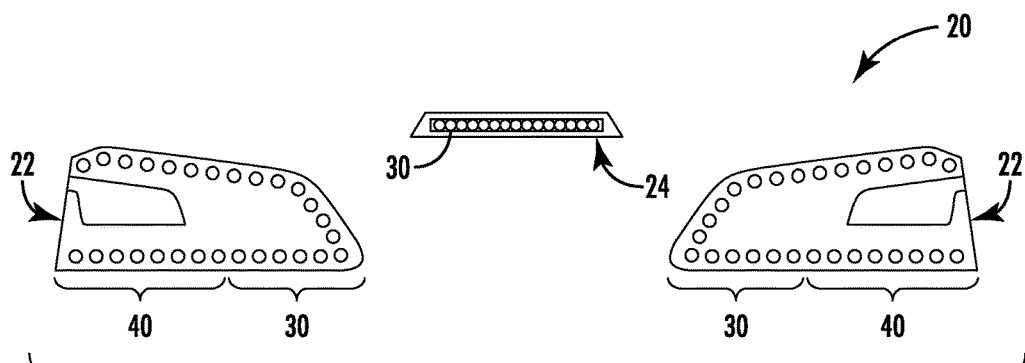
FIGS. 1A to 1I are plan views of a center high mount stop light and brake light assemblies of a variable brake light system according to another embodiment, illustrating the variable lighting capability of such system.

Referring to the figures generally, the various embodiments disclosed herein relate to a variable brake light system that includes a brake light assembly and a control system. The brake light assembly includes at least one static brake light and multiple variable brake lights. According to an exemplary embodiment, the static brake light is illuminated whenever the brake pedal is actuated, regardless of the force applied or the speed with which the brake pedal is actuated. The variable brake lights may be selectively illuminated depending on or proportional to the amount of brake pedal activation (e.g., how much force is exerted on the brake pedal, how far the brake pedal is depressed, how fast the brake pedal is depressed, etc.). For example, if only one of the variable brake lights is illuminated (see, e.g., FIGS. 1C and 2C), this may indicate a relatively low deceleration (i.e., slow) braking event. In contrast, the illumination of all of the variable brake lights (see, e.g., FIGS. 1I and 2F) may indicate a more severe (i.e., fast) braking event, such as would occur if a driver slammed on the brakes. Notably, the static brake lights and variable brake lights may be connected to separate circuits so that regardless of whether the variable brake lights are operational, the static brake light will illuminate whenever the brake pedal is actuated.

The variable brake light system may provide more information that conventional braking systems by allowing drivers (or other people, such as bicyclists) to be more aware of and informed about the vehicles in front of and around them. The variable brake light system allows drivers behind the leading vehicle to discern how severely the brake pedal in the leading vehicle is being depressed and therefore how quickly the leading vehicle is decelerating. Accordingly, the drivers behind the vehicle can react more appropriately to the leading vehicle braking in both high speed and low speed scenarios. Furthermore, the variable brake light system may help reduce traffic congestion by reducing the "accordion" effect that may be present in high traffic situations.

The variable brake light system is a simple design that is easily integratable into vehicles, adaptable to any vehicle, and reliable. The variable brake light system is relatively low cost to create and to implement into vehicles. Additionally, the variable brake light system still complies with vehicle regulations such that vehicles that adapt the variable brake light system are street legal. Furthermore, the variable brake light system is easily understood by nearby drivers (e.g., why the display of the variable brake lights changes and what the change in display indicates) and increases safety on the roads, thereby reducing the number of automotive accidents.

Since the variable brake light system includes both the static brake lights and the variable brake lights, original equipment manufacturers (OEMs) have additional flexibility and design with the brake light structures. Additionally, since the variable brake light system can connect to all of the lights in the back of the vehicle, the variable brake light system provides added variability.

Variable Brake Light System

The variable brake light system 20 described herein may be used within a variety of applications and moveable devices, such as vehicles, that include a brake pedal. The variable brake light system can be used within any type of vehicle, such as a two door or four door automobile, a truck, a SUV, a van, a train, a boat, an airplane, or other suitable vehicular conveyance. The variable brake light system is also useful in any non-vehicle application where it would be desirable to change the lighting based on a change in speed (e.g., the amount of deceleration).

In order to display when the vehicle is braking, the vehicle may include a brake light assembly 22 on both the right and left sides of the back of the vehicle as shown in FIGS. 1A-1I. Additionally, a center high mount stop light 24 (a so-called "CHMSL") may be positioned on the top center of the back of the vehicle (between the two brake light assemblies 22).

The variable brake light system 20 provides a comprehensive and all-inclusive rear light or taillight solution for the back of vehicles. Accordingly, the variable brake light system 20 includes a brake light assembly 22 and a control system 50. The brake light assembly 22 includes at least one static brake light 30 and multiple variable brake lights 40. Features of the variable brake light system 20 may be activated by the brake pedal, the hazard switch, and the right and left turn indicator switches, as described further herein.

The variable brake light system 20 may be an aftermarket device that is retrofit into an existing brake light system and utilizes current static brake lights 30 within the vehicle. For example, the static brake light 30 may be an existing brake light within the vehicle and may be able to operate without any interference from the variable brake light system 20. According to other exemplary embodiments, the variable brake light system 20 may integrate new or additional static brake lights 30 into the vehicle. Additionally, the first circuit 82 that controls the static brake light 30 may be an existing or new circuit within the vehicle. Accordingly, since the variable brake light system 20 can be implemented with any vehicle brake light, the variable brake light system 20 can increase the overall safety in both older vehicles and new vehicles.

Brake Light Assembly

Referring to FIGS. 1A-1I and 2A-2F, the variable brake light system 20 includes, activates, and controls the brake light assembly 22 in order to provide more information to people behind the vehicle regarding the vehicle deceleration. Each of the brake light assemblies 22 includes a first portion (i.e., at least one static brake light 30) and a second portion (i.e., one or more variable brake lights 40). The variable brake light system 20 ensures that the vehicle indicates to people behind the vehicle both that the vehicle is braking (i.e., through the static brake lights 30) and how fast the vehicle is decelerating (i.e., through the variable brake lights 40). By providing information regarding braking through both the static brake lights 30 and the variable brake lights 40 in tandem, the vehicle provides a more comprehensive display of how the vehicle is decelerating and indicates that the vehicle is braking, even if the variable brake lights 40 fail.

Figure 1B:
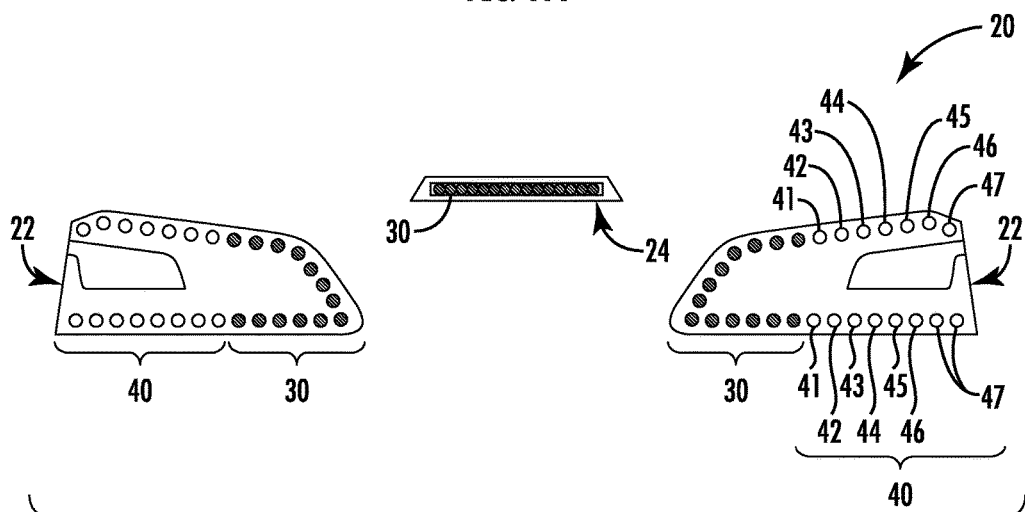

The display of the brake light assembly 22 depends on whether and how the brake pedal is activated. FIGS. 1A-1I and FIGS. 2A-2F each depict a potential sequence of the brake lights 30, 40 turning on as the brake pedal is increasingly activated (assuming the hazard switch and the turn indicator switches are not turned on) according to various embodiments. When the brake pedal is not activated at all, none of the brake lights 30, 40 are turned on (as shown in FIGS. 1A and 2A). When the brake pedal is only slightly activated (but the brake light activation is still less than the first specified level (as described further herein), only the static brake light 30 is turned on (as shown in FIGS. 1B and 2B). As the brake pedal is activated more, each of the variable brake lights 40 (such as variable lights 41, 42, 43, 44, 45, 46, 47) will sequentially turn on as each of the specified levels of brake light activation is met (as shown in FIGS. 1C-1I, 2C-2F, and 3 and as described further herein). However, it is understood that the variable brake light system 20 and the variable brake light assembly 22 may vary according to the desired configuration (i.e., the number of lights, how many variable brake lights 40 are activated according to how much the brake pedal is activated, etc.).

Alternatively or additionally, the intensity, brightness, and/or color of the variable brake lights 40 may change depending on how much the brake pedal is activated. For example, the variable brake lights 40 may include at least one RGB light emitting diode (LED) in order to allow the color of the variable brake lights 40 to change depending on the brake pedal activation. The control system 50 may ensure that, even with the intensity of the variable brake lights 40 changing, the brake light assembly 22 still meets the National Highway Traffic Safety Administration (NHTSA) standards for brake light functionality.

The brake light fixture or assembly 22 (as shown in FIGS. 1A-1I and 2A-2F) refers to the rear lights or taillights in the back of a vehicle. According to one embodiment as shown in FIGS. 1A-1I, a brake light assembly 22 may be positioned on each side of the back of the vehicle such that there is a left brake light assembly 22 and a right brake light assembly 22 that function in the same manner.

As described further herein and as shown in FIGS. 1A-1I and FIGS. 2A-2F, the multiple variable brake lights 40 may include any number of different brake lights, such as the first variable light 41, the second variable light 42, the third variable light 43, the fourth variable light 44, the fifth variable light 45, the sixth variable light 46, and the seventh variable light 47. As shown in FIGS. 1A-1I, each of the variable lights 41, 42, 43, 44, 45, 46, and 47 may refer to a group of multiple lights that are activated together. Alternatively, each of the variable lights 41, 42, 43, 44, 45, 46, and 47 may refer to a single light. According to one embodiment, the static brake light 30 and the variable brake lights 40 of the brake light assembly 22 are positioned along the back of the vehicle in order from lowest brake pedal activation to highest brake pedal activation. The lights that require the lowest brake pedal activation (e.g., the static brake light 30) may be positioned or located more inwardly (e.g., in the inner region of the back of the vehicle relative to the longitudinal centerline of the vehicle) than the lights that require higher brake pedal activation (e.g., the seventh variable light 47 (in the embodiment shown in FIGS. 1A-1I) or the fourth variable light 44 (in the embodiment show in FIGS. 2A-2F), which may be positioned in the outer region of the back of the vehicle).

For example, the static brake lights 30 may be positioned in an innermost region of the brake light assembly 22 relative to the variable brake lights 40 (e.g., the static brake light 30 may be closer to the longitudinal centerline of the vehicle than the variable brake lights 40). The first variable light 41 may be next to and between the static brake light 30 and the second variable light 42, the second variable light 42 may be next to and between the first variable light 41 and the third variable light 43, the third variable light 43 may be next to and between the second variable light 42 and the fourth variable light 44, and the fourth variable light 44 may be next to the third variable light 43 and may be in the outermost region of the brake light assembly 22 (in the embodiment shown in FIGS. 2A-2F) or next to the fifth variable light 45 (in the embodiment shown in FIGS. 1A-1I). As further shown in FIGS. 1A-1I, the fifth variable light 45 may be next to and between the fourth variable light 44 and the sixth variable light 46, the sixth variable light 46 may be next to and between the fifth variable light 45 and the seventh variable light 47, and the seventh variable light 47 may be next to the sixth variable light 46 and may be in the outermost region of the brake light assembly 22 if the seventh variable light 47 is the last light to be activated within the variable brake lights 40.

The lights on the right and left sides of the back of the vehicle may include only static brake lights 30, only variable brake lights 40, or both static brake lights 30 and variable brake lights 40 (as shown in FIGS. 1A-1I). Alternatively or additionally, the CHMSL 24 on the back of the vehicle may include only static brake lights 30, only variable brake lights 40, or both static brake lights 30 and variable brake lights 40. If the CHMSL 24 includes only static brake lights 30 (as shown in FIGS. 1A-1I), the CHMSL 24 may be turned on whenever the brake pedal is activated (as shown in FIGS. 1B-1I), which may provide an additional safety measure to ensure that the vehicle displays that it is braking.

The static brake lights 30 and the variable brake lights 40 may include a variety of different types of lighting sources, such as LEDs. For example, the static brake light 30 and the variable brake lights 40 may include red through-hole LEDs that are approximately 14,680 millicandela (mcd) with a forward voltage of approximately 2.1 volts (V). By using LEDs, the variable brake light system 20 allows for a massive reduction in required power to power the brake lights 30, 40 compared to conventional brake lights. Furthermore, LEDs provide more flexibility within lighting without limiting lumen output compared to conventional brake lights. Each of the variable lights 41, 42, 43, 44, 45, 46, 47 and the static brake light 30 may be a group of lights (e.g., LEDs) or a single power LED. According to other exemplary embodiments, other types of lights may be utilized in place of or in addition to the LEDs.

Static Brake Lights

The non-variable or static brake lights 30 function as binary lights in that the static brake lights 30 are either illuminated or not illuminated. Any amount of brake pedal activation causes the control system 50 to turn on the static brake lights 30. When the brake pedal is touched, pushed, or activated, regardless of the force exerted on the brake pedal or the displacement of the brake pedal, the control system 50 completely turns on the static brake lights 30. When the brake pedal is not pushed, the control system completely turns off the static brake lights 30. The static brake lights 30 ensure that lights are turned on when the brake pedal is pushed in order to both meet various safety requirements and standards and to provide a backup light in case the variable brake lights 40 do not function.

Variable Brake Lights

The variable brake lights 40 function on a scaling system and are sensitive to the amount, speed, force, or other characteristics of brake pedal activation. For example, the control system 50 changes the display (e.g., the number, lightness, lighting area, intensity, and/or brightness) of the variable brake lights 40 depending on or according to the amount of brake pedal activation. This change in display of the variable brake lights 40 indicates to people behind the vehicle how aggressively the brake pedal is being engaged and therefore how fast the vehicle is slowing down, decelerating, or stopping.

As shown in FIGS. 2A-2F, the variable brake lights 40 include multiple different lights, such as the first variable light 41, the second variable light 42, the third variable light 43, and the fourth variable light 44. As shown in FIGS. 1A-1I, the variable brake lights 40 may additionally include the fifth variable light 45, the sixth variable light 46, and the seventh variable light 47. Although four brake lights are shown and described in FIGS. 2A-2F and seven brake lights are shown and described in FIGS. 1A-1I, it is understood that the variable brake lights 40 of the brake light assemblies 22 can include any number of individual lights. Each of the variable brake lights 40 may turn on sequentially or in series in response to the brake pedal activation (e.g., with increasing applied force to the brake pedal).

Whether the control system 50 turns on or activates each of the variable brake lights 40 depends on the amount of brake pedal activation. The more that the brake pedal is activated, the higher the amount of brake pedal activation and the more variable brake lights 40 turn on (e.g., in number or in brightness).

The degree, level, or amount of brake pedal activation (e.g., activation of the brake pedal) may refer to a variety of different measurements that indicate how quickly the driver is decelerating the vehicle. For example, according to one embodiment, the amount of brake pedal activation depends on how much or the level or amount of force or pressure is exerted on or applied to the brake pedal (e.g., how hard the brake pedal is depressed). According to another embodiment, the amount of brake pedal activation depends on the level or amount of the displacement or depression of the brake pedal (e.g., how far the brake pedal is displaced or depressed). As described further herein, the variable brake lights 40 may be connected to the sensor 72 that is on or correlated with the brake pedal to determine the amount of brake pedal activation.

The amount of brake pedal activation can be delineated into different levels. Accordingly, the control system 50 turns on each of the variable brake lights 40 at different level of brake pedal activation. Greater or fewer of the variable brake lights 41, 42, 43, 44, 45, 46, 47 will be turned on depending on how much the brake pedal is activated (and how many variable brake lights 40 the variable brake light system 20 includes).

Figure 1C:
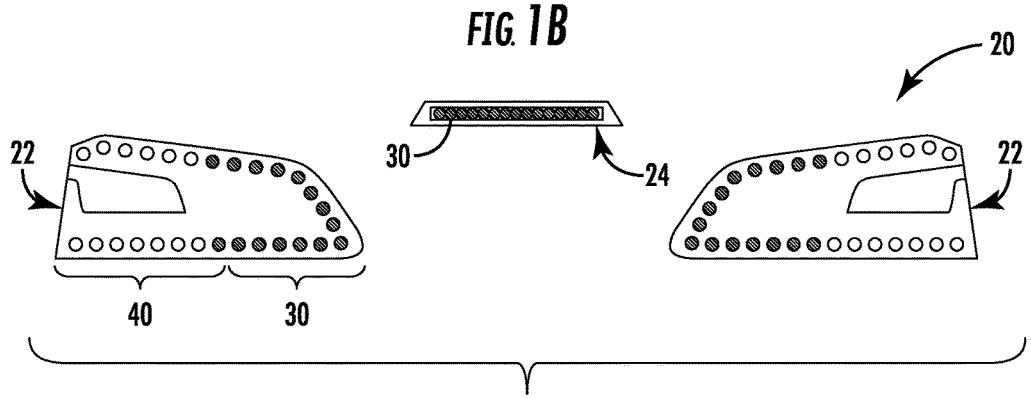
Figure 3:
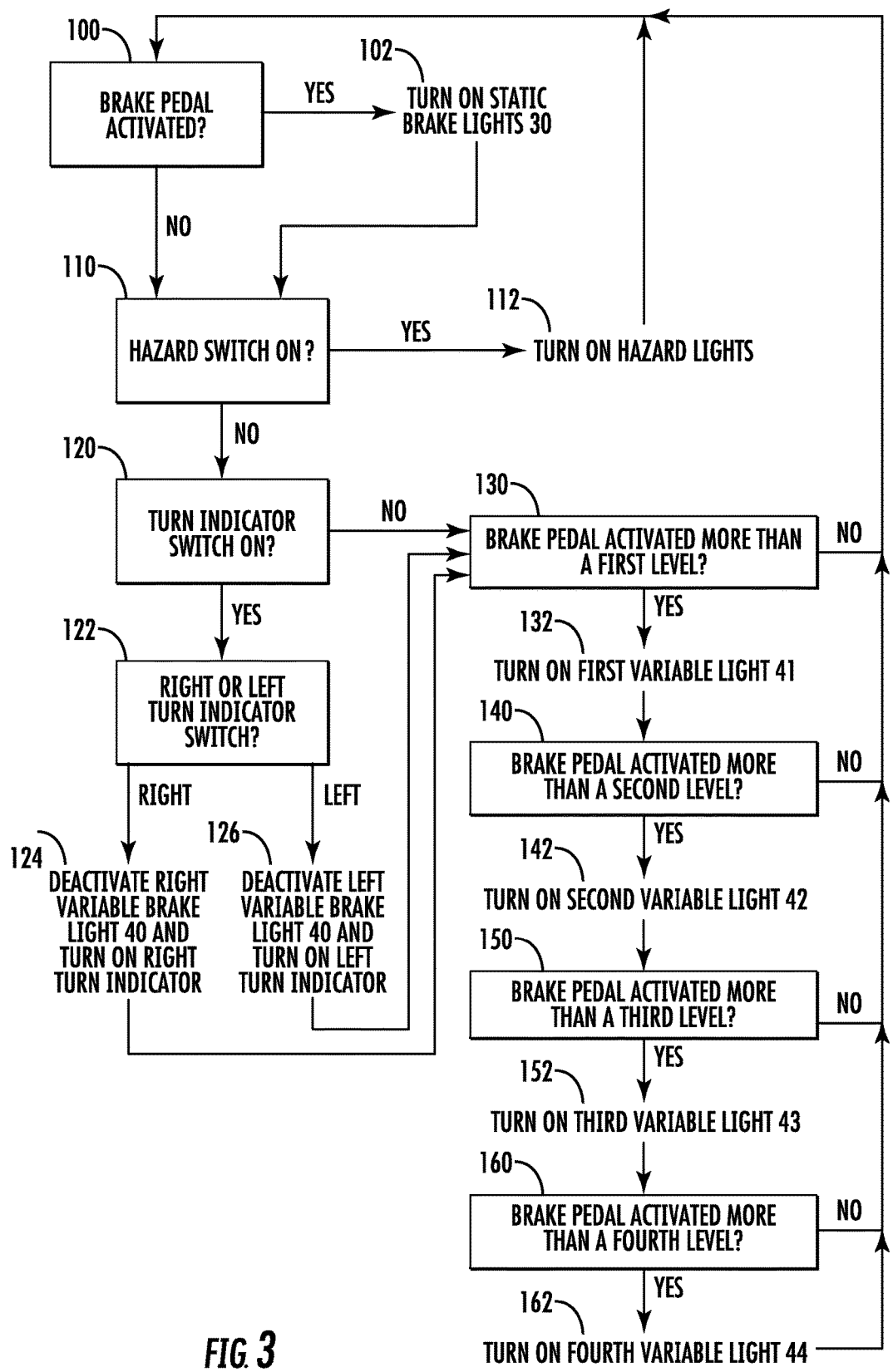
FIG. 3 is a schematic flow diagram illustrating the operation of a variable brake light system according to one embodiment.

As shown in FIGS. 1C, 2C, and 3, the control system 50 turns on the first variable light 41 (in addition to the static brake light 30) when the brake pedal is activated more than a first threshold or first specified level (or is within a first range) of brake pedal activation. The first level of brake pedal activation is less than the second, third, fourth, fifth, sixth, and seventh levels of brake pedal activation. Therefore, the first variable light 41 is turned on at a relatively low level of brake pedal activation (compared to the other variable brake lights 40). With increasing amounts of brake light activation, the first variable light 41 is turned on after the static brake light 30 and before the other variable brake lights 40.

According to one embodiment, the first variable light 41 does not turn on when the brake pedal is initially activated (and therefore when the static brake light 30 is initially turned on without any of the variable brake lights 40, as shown in FIGS. 1B and 2B). Instead, the control system 50 turns on the first variable light 41 at a higher amount of brake pedal activation than the amount of brake pedal activation when the static brake light is turned on (which may be a minimum amount of brake pedal activation).

Figure 1D:
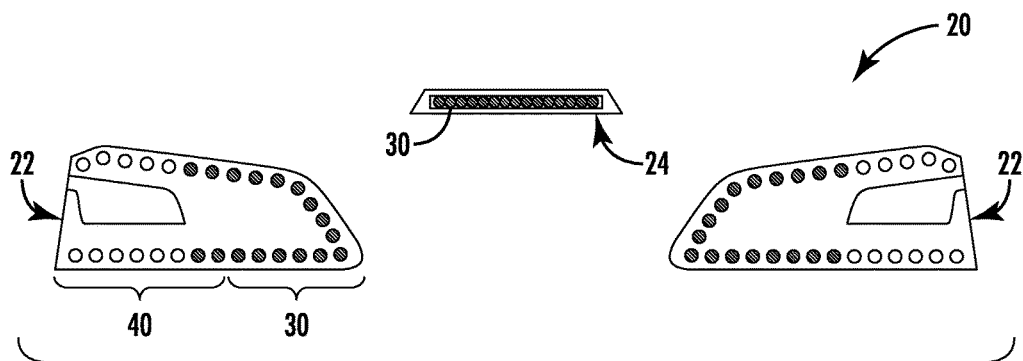

As shown in FIGS. 1D, 2D, and 3, the control system 50 turns on the second variable light 42 (in addition to the static brake light 30 and the first variable light 41) when the brake pedal is activated more than a second threshold or second specified level (or is within a second range) of brake pedal activation. The second level of brake pedal activation is greater than the first level of brake pedal activation and less than the third, fourth, fifth, sixth, and seventh levels of brake pedal activation. Therefore, the second variable light 42 is turned on at a relatively higher level of brake pedal activation (compared to the first variable light 41). With increasing amounts of brake light activation, the second variable light 42 is turned on after the static brake light 30 and the first variable light 41 and before the third variable light 43, the fourth variable light 44, the fifth variable light 45, the sixth variable light 46, and the seventh variable light 47.

Figure 1E:
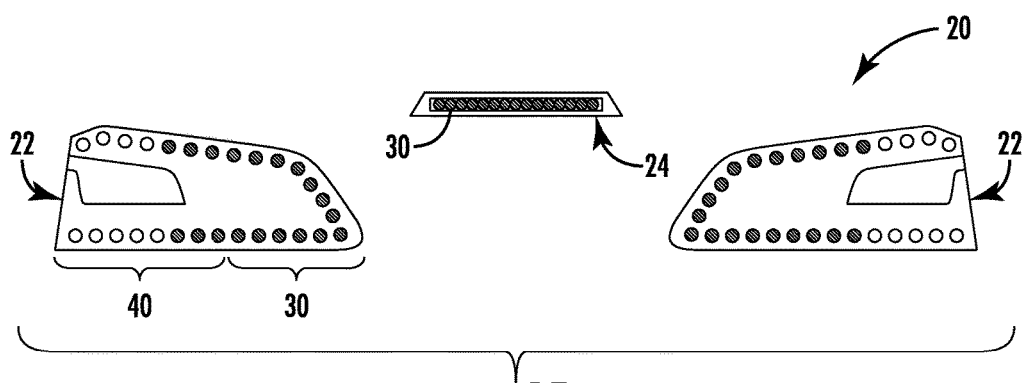

As shown in FIGS. 1E, 2E, and 3, the control system 50 turns on the third variable light 43 (in addition to the static brake light 30, the first variable light 41, and the second variable light 42) when the brake pedal is activated more than a third threshold or third specified level (or is within a third range) of brake pedal activation. The third level of brake pedal activation is greater than the first and second levels of brake pedal activation and less than the fourth, fifth, sixth, and seventh levels of brake pedal activation. Therefore, the third variable light 43 is turned on at a relatively higher level of brake pedal activation (compared to the first variable light 41 and the second variable light 42). With increasing amounts of brake light activation, the third variable light 43 is turned on after the static brake light 30, the first variable light 41, and the second variable light 42 and before the fourth variable light 44, the fifth variable light 45, the sixth variable light 46, and the seventh variable light 47.

Figure 1F:
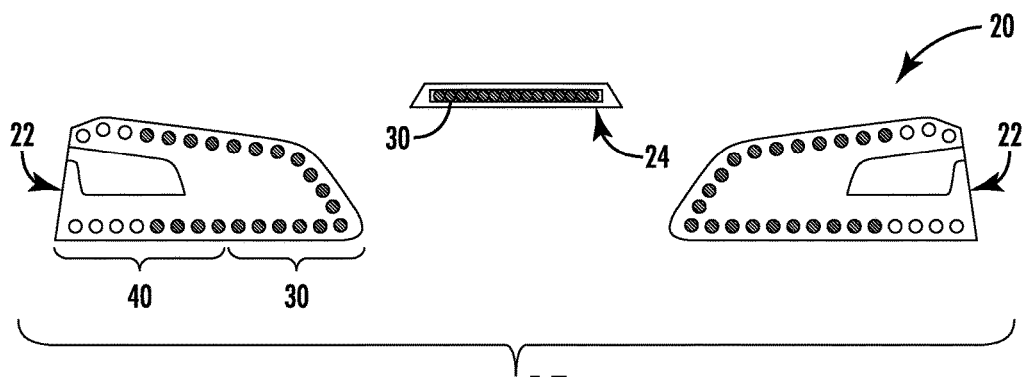
Figure 1G:
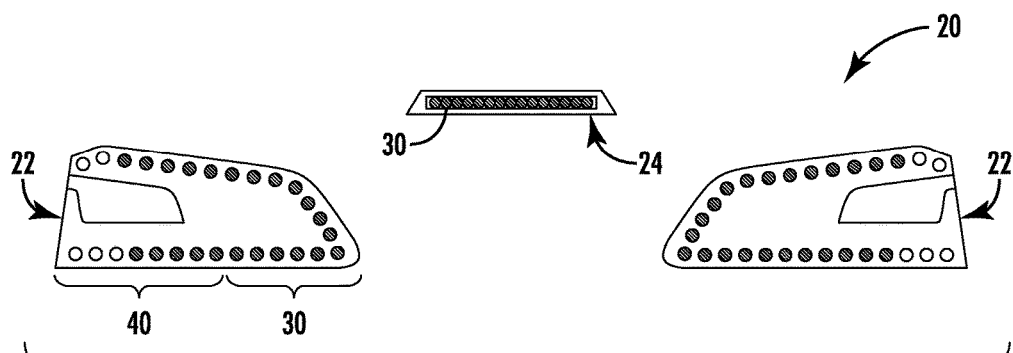
Figure 1H:
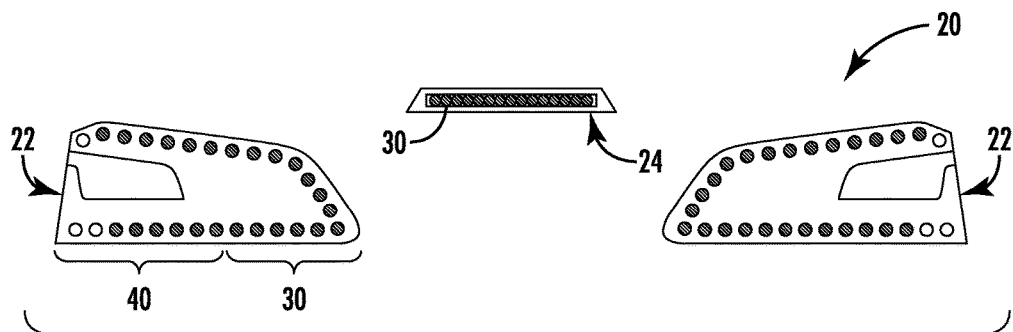
Figure 1I:
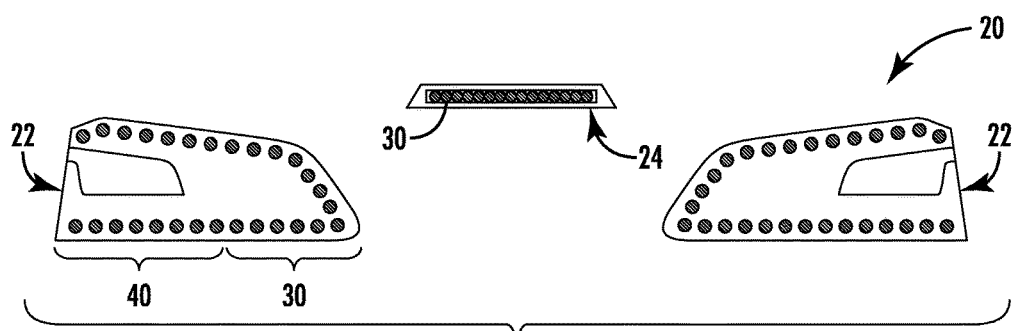

As shown in FIGS. 1F, 2F, and 3, the control system 50 turns on the fourth variable light 44 (in addition to the static brake light 30, the first variable light 41, the second variable light 42, and the third variable light 43) when the brake pedal is activated more than a fourth threshold or fourth specified level (or is within a fourth range) of brake pedal activation (or when the brake pedal is completely activated for the embodiment shown in FIGS. 2A-2F). The fourth level of brake pedal activation is greater than the first, second, and third levels of brake pedal activation and less than the fifth, sixth, and seventh levels of brake pedal activation (for the embodiment shown in FIGS. 1A-1I). Therefore, the fourth variable light 44 is turned on at a relatively higher level of brake pedal activation (compared to the first variable light 41, the second variable light 42, and the third variable light 43). With increasing amounts of brake light activation, the fourth variable light 44 is turned on after the static brake light 30, the first variable light 41, the second variable light 42, and the third variable light 43 and before the fifth variable light 45, the sixth variable light 46, and the seventh variable light 47.

It is understood that the variable brake light system 20 may be adjusted according to the number of variable brake lights 40. For example, the fifth variable light 45, the sixth variable light 46, and the seventh variable light 47 (as shown in FIGS. 1A-1I) each function in a similar manner as described with respect to the first variable light 41, the second variable light 42, the third variable light 43, and the fourth variable light. Furthermore, each of the fifth variable light 45, the sixth variable light 46, and the seventh variable light 47 have a corresponding threshold or specified level or range of brake pedal activation.

By turning on or off each of the variable lights 41, 42, 43, 44, 45, 46, 47 at different specified levels, people behind the vehicle can easily determine the relative amount brake pedal activation by seeing how many of the variable lights 41, 42, 43, 44, 45, 46, 47 are turned on. As shown in FIGS. 1C-1I and 2C-2F, each of the variable lights 41, 42, 43, 44, 45, 46, 47 stay on as long as the respective specified level of brake pedal activation is met such that multiple variable lights 41, 42, 43, 44, 45, 46, 47 can be on at the same time. Once the specified level of brake light activation is no longer met, the respective variable light 41, 42, 43, 44, 45, 46, 47 is turned off.

Although seven variable brake lights 40 are referred to herein, it is understood that the variable brake light system 20 can be adjusted to accommodate any number of variable brake lights 40. Each of the corresponding levels of brake light activation for each of the variable brake lights 40 may be adjusted according to the number of variable brake lights 40.

Control System

Figure 4:
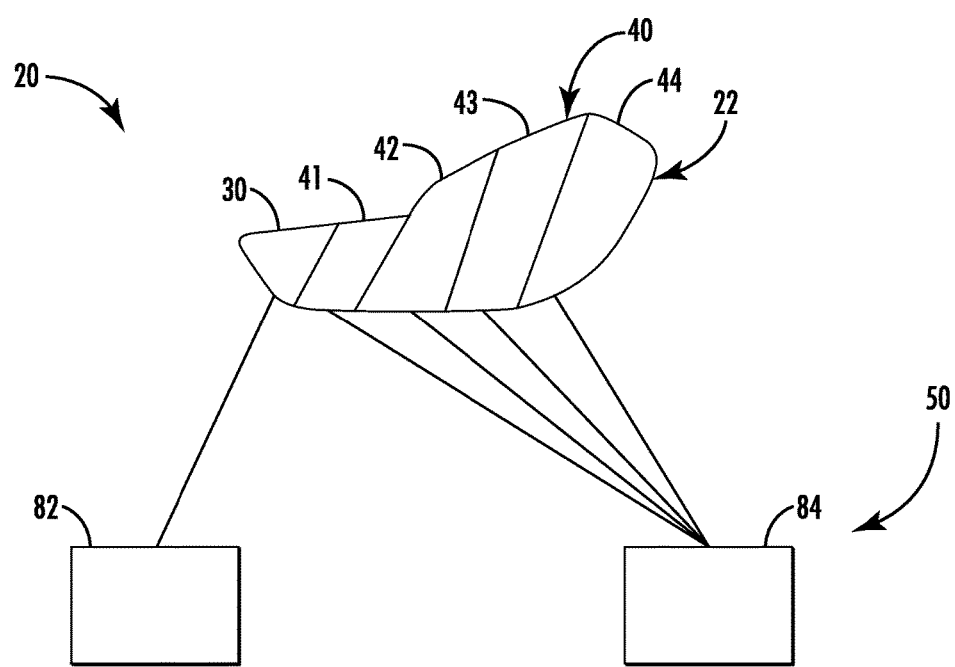
FIG. 4 is a schematic view of the variable brake light system according to an embodiment.

The variable brake light system 20 includes a brake light controller or control system 50 that connects and correlates the static brake light 30 and the variable brake lights 40 to the brake pedal. As shown in FIG. 4, the control system 50 includes two simple and adaptable circuits: a first circuit 82 and a second circuit 84.

The first circuit 82 is paired with or connects to and controls the static brake light 30. Accordingly, the first circuit 82 of the control system 50 is configured to turn on the static brake light 30 when the brake pedal is activated.

The second circuit 84 is paired with or connects to and controls the variable brake lights 40. Accordingly, the second circuit 84 of the control system 50 is configured to change the display of the brake light assembly 22 by changing the display of the variable brake lights 40 in relation to the manner in which the brake pedal is actuated. The second circuit 84 may turn on the variable brake lights 40 after the first circuit 82 has turned on the static brake light 30. Subsequently, the second circuit 84 may turn on each of the variable brake lights 40 in series as the amount of brake pedal activation increases (e.g., more lights will illuminate with increasing force, etc.). As described further herein, the amount of brake pedal activation may be delineated into different levels and each of the variable brake lights 40 may be turned on a particular level of brake pedal activation.

The first circuit 82 and the second circuit 84 are configured and controlled separately and operate independently of one another. Accordingly, if the second circuits 84 fails, the first circuit 82 will still work and activate at least the static brake lights 30. Accordingly, the static brake lights 30 are not affected by and do not depend on the second circuit 84 or the microprocessor (for the variable brake lights 40). Therefore, the static brake lights 30 may act as back-up lights and will not fail if the second circuit 84 or microprocessor fails. Accordingly, the vehicle does not solely rely on the variable brake lights 40 to indicate when the brake pedal is being activated.

The first circuit 82 and the second circuit 84 are configured to handle signal voltage from the vehicle, any alternating circuit (AC) noise, and vibration from the vehicle. The first circuit 82 and the second circuit 84 may be changed or adapted in order to adjust the accuracy.

The control system 50 can include at least one circuit board that can include, secure, or connect a variety of different components in order to properly control the variable brake lights 40. To ensure that the variable brake light system 20 is reliable and safe, the control system 50 may include safety features, such as diodes, in order to avoid a reverse current.

Although the circuit board can optionally be configured to control the static brake light 30, the static brake light 30 may be configured to function in tandem with the circuit board, but separately through a different system (e.g., a wire). Accordingly, if the circuit board fails for any reason, the static brake light 30 will still function regardless as an added safety measure.

The control system 50 may include a data input sensor 72 that is positioned on or within or controlled by the brake pedal in order to measure or determine certain values or information, such as the amount of brake pedal activation (which may be determined based on, for example, the amount of pressure exerted on the brake pedal or the position of the brake pedal). The sensor 72 is connected to the variable brake lights 40 (through, for example, the second circuit 84). The sensor 72 converts information from the brake pedal into a signal or output, which may be converted into a voltage output to determine how to display the variable brake lights 40. For example, if the sensor 72 is a pressure sensor, the second circuit 84 may convert the force (in foot-lbs) that is exerted on the brake pedal and measured by the sensor 72 into a voltage output.

The sensor 72 may be a variety of different sensors, including but not limited to angular, pressure, force, displacement, positional, optical, resistive, and capacitive sensors. For example, the sensor 72 may be a pressure sensor to measure the amount of pressure or force applied to the brake pedal. Alternatively, the sensor 72 may be a displacement, rotational, or position sensor to measure the amount of displacement, rotation, or position of the brake pedal. According to one embodiment, the sensor 72 may be a piezometer. The sensors 72 that are not pressure sensors may allow the driver to activate the sensor by pressing on a variety of different areas of the brake pedal (rather than a particular area of the brake pedal, such as the middle).

According to one embodiment, the sensor 72 may be a force-sensitive resistor with a force sensitivity range between approximately 0.2-20 newtons (N). The force-sensitive resistor changes resistance based on the amount of applied force. Since the force and resistance have an inverse relationship, the resistance of the force-sensitive resistor decreases when the force exerted on the brake pedal increases. According to one embodiment, the force-sensitive resistor may be Interlink Electronics FSR 406.

The control system 50 may also include at least one microprocessor. According to one embodiment, the microprocessor may be a XMC1301T038F0032 microprocessor with a 32 bit ARM so the microprocessor is easy to move from chip to chip. The microprocessor may have a 32 KB memory, 38 legs (TSSOP package), and integrated analog to digital. According to other exemplary embodiments, other types of microprocessors maybe utilized.

The microprocessor may be coded or programmed to control the variable brake lights 40 by converting analog data from the brake pedal and controlling the variable brake lights 40 accordingly. Therefore, the microprocessor includes an analog to digital connection (ADC). According to one embodiment, the ADC is 12 bits. Accordingly, the microprocessor reads from 0 to $(12^{12}-1)$. The voltage range of the microprocessor is between 0 and 5V since the microprocessor is within a vehicle. According to one embodiment, the voltage range of the microprocessor may between 1.5 and 3.5V in order to leave some buffer. The microprocessor may also run on a 5V regulator. The microprocessor may further include a loop-back feature in order to be constantly receiving and converting data from the brake pedal (through, for example, a sensor 72).

The control system 50 may also include at least one power resistor that is approximately 510Ω and approximately 1 watt. The control system 50 may include a transistor. According to one embodiment, the transistor may be an n-channel metal-oxide-semiconductor field-effect transistor (MOSFET N-CH) that is approximately 40V and 50 A for reliability. The control system 50 may include a switch toggle, such as SPST 0.4VA 20V. The control system 50 may be at least partially on an evaluation board, such as Eval Board Boot Kit XMC1300, MCU 32-Bit.

Process of the Variable Brake Light System within a Vehicle

As shown in FIG. 3, different layers or types of vehicle lights may override other vehicle lights. For example, the hazard lights and the right and left turn signals within the vehicle may utilize the same lights that the variable brake lights 40 utilize. Therefore, the hazard lights and the right and left turn indicators may take priority over the variable brake lights 40. Accordingly, when the hazard switch, the right turn indicator switch, or the left turn indicator switch are turned on, the variable lights 41, 42, 43, 44, 45, 46, 47 on both sides of the vehicle, on the right side of the vehicle, or the left side of the vehicle, respectively, may instead function as hazard lights or turn indicator lights (instead of as brake lights) by blinking or flashing (until the hazard switch or the turn switch is turned off).

More specifically, the hazard switch overrides the variable brake lights 40 such that turning on the hazard switch deactivates the variable brake lights 40. Accordingly, when the brake pedal is activated and the hazard switch is turned on, only the static brake lights 30 turn on and the variable brake lights 40 do not turn on, regardless of how much the brake pedal is activated.

The right and left turn signals or indicator switches may also override the variable brake lights 40. For example, when one turn indicator switch (e.g., the left turn indicator switch) is turned on, the variable brake lights 40 on the same side (e.g., the left side) of the vehicle are deactivated. Accordingly, the brake pedal activation only affects the opposite side (e.g., the right side) of the vehicle such that, when the brake pedal is activated, the variable brake lights 40 on the same side (e.g., the left side) of the vehicle are not turned on or activated (regardless of how much the brake pedal is activated) but the variable brake lights 40 on the opposite side (e.g., the right side) of the vehicle can still be turned on. The static brake lights 30 may not be affected by whether the right and left turn indicator switches are turned on. The opposite scenario with the right turn indicator switch instead may also be true.

FIG. 3 depicts how and when the static brake lights 30 and the variable brake lights 40 are turned on with respect to the brake pedal, the hazard control or switch for the hazard lights, and the turn indicator controls or switches for the turn indicators. If the brake pedal is activated (100), the control system 50 turns on the static brake lights 30 (102) and then checks whether the hazard switch is on (110). The static brake lights 30 are not deactivated when the hazard switch is turned on or when a turn indicator switch is turned on. Therefore, the control system 50 will turn on the static brake lights 30 when the brake pedal is depressed, even if at least one of the hazard switch and a turn indicator switch is turned on. If the brake pedal is not activated (100), the control system 50 checks whether the hazard switch is on (110).

If the hazard switch is on (110), the control system 50 turns on the hazard lights (112) and then loops back to check whether the brake pedal is activated (100) (and therefore does not turn on the turn indicators or any of the variable brake lights 40). Accordingly, when the hazard switch is on, the variable brake lights 40 are deactivated. If the hazard switch is off (110), the control system 50 checks whether a turn indicator switch is on (120).

If the turn indicator switch is on (120), the control system 50 checks whether the right turn indicator switch is on or the left turn indicator switch is on (122). If the right turn indicator switch is on, the control system 50 deactivates the variable brake lights 40 on the right side of the vehicle and turns on the right turn indicator (124). If the left turn indicator switch is on, the control system 50 deactivates the variable brake lights 40 on the left side of the vehicle and turns on the left turn indicator (126). After turning on either the right turn indicator or the left turn indicator, the control system 50 checks whether the brake pedal is activated and activated more than a first level (130). If the turn indicator switch is not on (120), the control system 50 checks whether the brake pedal is activated and activated more than the first level (130).

If the brake pedal is not activated more than the first level (130), the control system 50 loops back to check whether the brake pedal is activated (100) (and therefore does not turn on any of the variable brake lights 40). If the brake pedal is activated more than the first level (130), the control system 50 turns on the first variable light 41 (132) and checks if the brake pedal is activated more than a second level (140).

If the brake pedal is not activated more than the second level (140), the control system 50 loops back to check whether the brake pedal is activated (100). If the brake pedal is activated more than the second level (140), the control system 50 turns on the second variable light 42 (142) and checks if the brake pedal is activated more than a third level (150).

If the brake pedal is not activated more than the third level (150), the control system 50 loops back to check whether the brake pedal is activated (100). If the brake pedal is activated more than the third level (150), the control system 50 turns on the third variable light 43 (152) and checks if the brake pedal is activated more than a fourth level (160).

If the brake pedal is not activated more than the fourth level (160), the control system 50 loops back to check whether the brake pedal is activated (100). If the brake pedal is activated more than the fourth level (160), the control system 50 turns on the fourth variable light 44 (162) and then loops back to check whether the brake pedal is activated (100).

It is understood that the control system 50 may be adjusted according to the number of variable brake lights 40. For example, if the variable brake light system 20 includes more than four variable brake lights 40 (as shown in FIGS. 1A-1I, for example), it is understood that the control system 50 may function in a similar manner as described with respect to the first variable light 41, the second variable light 42, the third variable light 43, and the fourth variable light for the additional variable brake lights 40 (e.g., the fifth variable light 45, the sixth variable light 46, and the seventh variable light 47).

Figure 5:
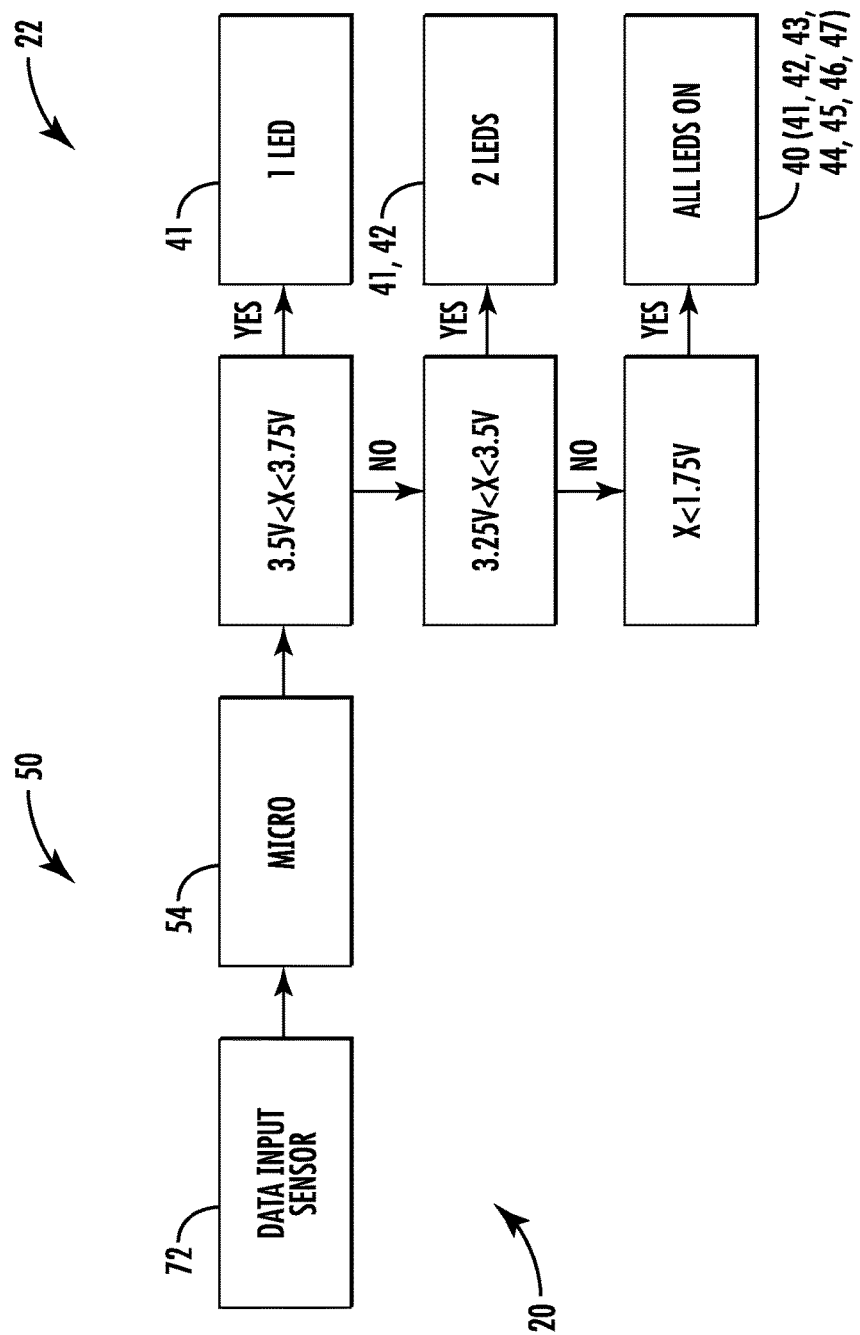
FIG. 5 is a schematic flow diagram illustrating the operation of a variable brake light system according to yet another embodiment.

According to another embodiment as shown in a software flowchart in FIG. 5, the data input sensor 72 (such as a piezometer) is activated when the brake pedal is activated, which sends a signal to the microprocessor to be processed. The microprocessor determine if and how many of the variable brake lights 40 should be turned on based on the amount of force on the brake pedal (as read by the sensor 72). If the signal (X) of the force is greater than 3.5 V and less than 3.75 V (e.g., a first range), the first variable light 41 is turned on. If the signal (X) is greater than 3.25 V and less than 3.5 V (e.g., a second range), both the first variable light 41 and the second variable light 42 are turned on. If the signal (X) is less than 1.75 V, all of the variable brake lights 40 are turned on. Although only three steps for testing the signal (X) are included in the embodiment shown in FIG. 5, it is understood that the variable brake light system 20 may have any number of steps for any number of variable brake lights 40 and any number of ranges of voltages.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A brake light controller comprising:
 a first circuit configured to turn on at least one static brake light of a brake light assembly when a brake pedal is activated; and
 a second circuit configured to change a display of the brake light assembly depending on at least one of pressure applied to the brake pedal or a displacement of the brake pedal, wherein the second circuit is configured to turn on multiple variable brake lights;
 wherein the brake light assembly includes the at least one static brake light and the multiple variable brake lights; and
 wherein the multiple variable brake lights include a first variable light that is next to the at least one static brake light,
 wherein the first circuit and the second circuit operate independently of one another.

2. The brake light controller according to claim 1, wherein the second circuit is configured to turn on at least one of the multiple variable brake lights of the brake light assembly after the first circuit turns on the at least one static brake light of the brake light assembly.

3. The brake light controller according to claim 1, wherein the second circuit is configured to turn on the multiple variable brake lights in series.

4. The brake light controller according to claim 3, wherein the first variable light is turned on first before the other multiple variable brake lights.

5. The brake light controller of claim 1, wherein the multiple variable brake lights further comprises a second variable light, wherein the at least one static brake light, the first variable light and the second variable light are aligned with each other.

6. A variable brake light system within a vehicle with a brake pedal, the variable brake light system comprising:
 a static brake light;
 multiple variable brake lights; and
 a control system including a first circuit and a second circuit that operate independently of one another, wherein the first circuit controls the static brake light and the second circuit controls the multiple variable brake lights;
 wherein the control system is configured to turn on the static brake light when the brake pedal is activated;
 wherein the control system is configured to change a display of the multiple variable brake lights according to an amount of activation of the brake pedal; and
 wherein the multiple variable brake lights include a first variable light that is next to the static brake light.

7. The variable brake light system of claim 6, wherein the multiple variable brake lights further comprises a second variable light.

8. The variable brake light system of claim 7, wherein the control system turns on the first variable light when the brake pedal is activated more than a first specified level, wherein the control system turns on the second variable light in addition to the first variable light when the brake pedal is activated more than a second specified level, wherein the second specified level is greater than the second specified level.

9. The variable brake light system of claim 6, wherein the control system deactivates the multiple variable brake lights when at least one of a hazard switch is turned on or a turn indicator switch is turned on.

10. The variable brake light system of claim 9, wherein the static brake lights are not deactivated when at least one of the hazard switch is turned on or the turn indicator switch is turned on such that the static brake lights are configured to turn on when the brake pedal is depressed and at least one of the hazard switch or the turn indicator switch is turned on.

11. The variable brake light system of claim 6, wherein the amount of activation of the brake pedal depends on the amount of force exerted on the brake pedal.

12. The variable brake light system of claim 6, wherein the amount of activation of the brake pedal depends on the amount of displacement of the brake pedal.

13. The variable brake light system of claim 6, wherein any amount of activation of the brake pedal causes the control system to turn on the static brake light.

14. The variable brake light system of claim 6, wherein the control system includes a sensor configured to measure the amount of activation of the brake pedal.

15. The variable brake light system of claim 14, wherein the sensor is at least one of a pressure sensor or a position sensor.

16. A method of controlling a brake light assembly of a variable brake light system within a vehicle with a brake pedal, the method comprising:
 turning on a static brake light within the variable brake system with a first circuit when the brake pedal is activated; and
 changing a display of multiple variable brake lights within the variable brake system with a second circuit according to an amount of activation of the brake pedal;
 wherein the multiple variable brake lights include a first variable light that is next to the static brake light;
 wherein the first circuit and the second circuit operate independently of one another.

17. The method of claim 16, wherein the step of changing the display of multiple variable brake lights includes turning on the first variable light when the brake pedal is activated more than a first specified level and turning on a second variable light in addition to the first variable light when the brake pedal is activated more than a second specified level, wherein the second specified level is greater than the second specified level.

18. The method of claim 16, further comprising deactivating the multiple variable brake lights when at least one of a hazard switch is turned on or a turn indicator switch is turned on.

19. The method of claim 16, further comprising measuring the amount of activation of the brake pedal with a sensor.

* * * * *